United States Patent
Sivaramu et al.

(10) Patent No.: US 11,637,775 B2
(45) Date of Patent: Apr. 25, 2023

(54) METHODS AND SYSTEMS FOR LOCATION IDENTIFIER BASED FORWARDING

(71) Applicant: Pensando Systems Inc., Milpitas, CA (US)

(72) Inventors: Raghava Kodigenahali Sivaramu, Fremont, CA (US); Murali Kashyap Garimella, Milpitas, CA (US); Vijay Sampath, Milpitas, CA (US)

(73) Assignee: Pensando Systems Inc., Milpitas, CA (US)

( * ) Notice: Subject to any disclaimer, the term of this patent is extended or adjusted under 35 U.S.C. 154(b) by 106 days.

(21) Appl. No.: 17/180,009

(22) Filed: Feb. 19, 2021

(65) Prior Publication Data

US 2022/0272036 A1      Aug. 25, 2022

(51) Int. Cl.
*H04L 45/74* (2022.01)
*H04L 12/46* (2006.01)
*H04L 45/24* (2022.01)
*H04L 45/02* (2022.01)

(52) U.S. Cl.
CPC .......... *H04L 45/74* (2013.01); *H04L 12/4641* (2013.01); *H04L 45/02* (2013.01); *H04L 45/04* (2013.01); *H04L 45/24* (2013.01); *H04L 2212/00* (2013.01)

(58) Field of Classification Search
CPC ..... H04L 45/74; H04L 12/4641; H04L 45/02; H04L 45/04; H04L 45/24; H04L 2212/00
See application file for complete search history.

(56) References Cited

U.S. PATENT DOCUMENTS

2014/0112349 A1* 4/2014 Moreno ................. H04L 45/64
                                                    370/400
2016/0149808 A1* 5/2016 Cai ....................... H04L 12/4633
                                                    370/395.53

OTHER PUBLICATIONS

Wikipedia, "Border Gateway Protocol", https://en.wikipedia.org/wiki/Border_Gateway_Protocol, retrieved Feb. 17, 2021, 18 pages.
Wikipedia, "IEEE 802.1Q", https://en.wikipedia.org/wiki/IEEE_802.1Q, retrieved Feb. 17, 2021, 4 pages.
Juniper Networks, "Junos® OS, EVPN User Guide", Published Sep. 28, 2020, 1727 pgs.
Lougheed, K. "A Border Gateway Protocol (BGP)", Request for Comments: 1105, Jun. 1989, 17 pgs.

(Continued)

*Primary Examiner* — Kibrom T Hailu
(74) *Attorney, Agent, or Firm* — Loza & Loza LLP

(57) ABSTRACT

A packet can be sent on a VLAN from a first machine that has a first address on the VLAN to a second machine that has a second address on the VLAN and that is located at a remote location associated with a remote location identifier. A network appliance can use the second address to determine the remote location identifier, can encapsulate the packet in a local segment packet that includes a local VNID and the remote location identifier; and can send the local segment packet to a local router. The local router can use the remote location identifier and the local VNID to determine a remote router and a remote VNID, can encapsulate the packet in an outer packet, which can be a VxLAN packet, that includes the remote VNID, and can send the outer packet to the remote router.

20 Claims, 12 Drawing Sheets

(56) References Cited

OTHER PUBLICATIONS

Rekhter, Y. et al. "A Border Gateway Protocol 4 (BGP-4)", Request for Comments: 4271, Jan. 2006, 104 pgs.
Mahalingam, M. et al. "Virtual extensible Local Area Network (VXLAN): A Framework for Overlaying Virtualized Layer 2 Networks over Layer 3 Networks", Request for Comments: 7348, Aug. 2014, 22 pgs.
Wiki.Kemot-Net.Com: "VPN EVPN BGP", http://wiki.kemot-net.com/vpn-evpn-bgp, retrieved Dec. 8, 2020, 2 pgs.

* cited by examiner

METHODS AND SYSTEMS FOR LOCATION IDENTIFIER BASED FORWARDING

TECHNICAL FIELD

The embodiments relate to computer networks, local area networks, virtual local area networks, virtual tunnels, virtual private networks, ethernet virtual private networks, virtual extensible local area networks, virtual machines, network routing, network switching, network interface cards, network appliances, networking hardware, and to routing packets between separate regions of a virtual local area network.

BACKGROUND

A local area network (LAN) can provide private network connections between machines in a local area. A virtual LAN (VLAN) can partition a LAN into different segments such that groups of machines on the LAN are isolated from one another. A virtual private network (VPN) can extend a private network, such as a local LAN, across a public network. A VPN can let machines at two different locations communicate as if both are on the same private network. Ethernet VPN (EVPN) is a technology for carrying layer 2 Ethernet traffic as a virtual private network using wide area network protocols. EVPN technologies include Ethernet over multiprotocol label switching (MPLS) and Ethernet over virtual extensible LAN (VxLAN). Using EVPN, a business having three locations can have a VLAN that includes machines at all three locations. EVPN is also used in data centers to connect an application's virtual machines (VMs) on a single VPN. The VMs can run on different host machines in different parts of the data center. Using EVPN, the VMs can communicate via the application's private network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include sending a packet on a virtual local area network (VLAN) from a first machine that has a first address on a VLAN to a second machine that has a second address on the VLAN and that is located at a remote location associated with a remote location identifier, using the second address to determine the remote location identifier, encapsulating the packet in a local segment packet that includes a local virtual network identifier (VNID) and the remote location identifier, and sending the local segment packet to a local router, wherein the local router is configured to use the remote location identifier and the local VNID to determine a remote router and a remote VNID, the local router is configured to encapsulate the packet in an outer packet that includes the remote VNID, and the local router is configured to send the outer packet to the remote router.

Another aspect of the subject matter described in this disclosure can be implemented by a system. The system can include a network appliance, wherein the network appliance is configured to send a packet on a virtual local area network (VLAN) from a first machine that has a first address on a VLAN to a second machine that has a second address on the VLAN and that is located at a remote location associated with a remote location identifier, the network appliance is configured to use the second address to determine the remote location identifier, the network appliance is configured to encapsulate the packet in a local segment packet that includes a local virtual network identifier (VNID) and the remote location identifier, the network appliance is configured to send the local segment packet to a local router, the local router is configured to use the remote location identifier and the local VNID to determine a remote router and a remote VNID, the local router is configured to encapsulate the packet in an outer packet that includes the remote VNID, the local router is configured to send the packet to the remote router.

Yet another aspect of the subject matter described in this disclosure can be implemented by a system comprising a means for sending a packet on a virtual local area network (VLAN) to a remote machine at a remote location, and a means for routing the packet to the remote location using a remote location identifier and without determining a virtual tunnel endpoint (VTEP) that the remote machine uses to access the VLAN.

In some implementations of the methods and devices, the second machine accesses the VLAN using a remote virtual tunnel endpoint (VTEP) provided by a remote host, the remote VTEP has a remote VTEP address, a local host encapsulates the packet in the local segment packet, the local host processes the packet without using the remote VTEP address, and the local router is configured to process the packet using a forwarding rule that does not include the remote VTEP address. In some implementations of the methods and devices, the remote router is configured to use the second address to determine a remote VTEP address, the remote router is configured to encapsulate the packet in a remote segment packet that includes the remote VNID, the remote router is configured to send the remote segment packet to a remote host, and the second machine receives the packet via the remote host.

In some implementations of the methods and devices, the first machine is configured to send the packet to the second machine via a local VTEP that is provided by a local network appliance, the VLAN includes a plurality of remote machines located at the remote location, and the local network appliance implements a single forwarding rule for forwarding packets to the remote machines. In some implementations of the methods and devices, the method includes receiving the local segment packet, using the remote location identifier and the local VNID to determine the remote router and the remote VNID, encapsulating the packet in the outer packet, and sending the outer packet to the remote router. In some implementations of the methods and devices, the method includes implementing, by the local router, a forwarding rule based on a border gateway protocol packet that includes the remote location identifier, an address of the remote router, the local VNID, and the remote VNID, and encapsulating the packet in the outer packet based on the forwarding rule.

In some implementations of the methods and devices, the method includes implementing a forwarding rule based on a border gateway protocol packet that includes the remote location identifier, an address of the local router, and the local VNID. The method can also include encapsulating the packet in the local segment packet based on the forwarding rule. In some implementations of the methods and devices, the first machine is a virtual machine running on a local host configured with a network interface card (NIC) that sends the local segment packet to the local router, and the NIC includes a packet processing pipeline configured to encapsulate the packet in the local segment packet. In some implementations of the methods and devices the local router includes a packet processing pipeline configured to encapsulate the packet in the outer packet.

In some implementations of the methods and devices, the method includes receiving, by the local router, a second outer packet that includes the local VNID and a second packet that has the first address as a destination address, using the first address to determine a local VTEP provided by a local host, sending the second packet to the local host encapsulated in a remote segment packet, and delivering the second packet to the first machine via the local VTEP. In some implementations of the methods and devices, the second machine accesses the VLAN using a remote virtual tunnel endpoint (VTEP) provided by a remote host, and the network appliance processes the packet without using a forwarding rule that includes the remote VTEP address. In some implementations of the methods and devices, a second local VNID and a second remote VNID are used by a second VLAN, and the local router is configured to use the remote location identifier and the second local VNID to determine the remote router and the second remote VNID.

In some implementations of the methods and devices, the local router receives a border gateway protocol packet that includes the remote location identifier, an address of the remote router, the local VNID, and the remote VNID. In some implementations of the methods and devices, the local router implements a forwarding rule based on the border gateway protocol packet, and the local router encapsulates the packet in the outer packet based on the forwarding rule. In some implementations of the methods and devices the local router is configured to receive a second outer packet that includes the local VNID and a second packet that has the first address as a destination address, use the first address to determine a local VTEP provided by a local host, encapsulate the second packet in a second local segment packet, and send the second local segment packet to the local host. In some implementations of the methods and devices, the network appliance receives a border gateway protocol packet that includes the remote location identifier, an address of the local router, and the local VNID, the network appliance implements a forwarding rule based on the border gateway protocol packet, and the network appliance encapsulates the packet in the local segment packet based on the forwarding rule. In some implementations of the methods and devices, the network appliance is a network interface card (NIC) installed in a local host, the first machine is a virtual machine running on the local host, and the NIC includes a packet processing pipeline configured to encapsulate the packet in the local segment packet.

In some implementations of the methods and devices, the system includes a means for sending a second packet on a second VLAN to a second remote machine at the remote location, and a means for routing the second packet to the remote location using the remote location identifier and without determining a second VTEP used by the second remote machine for accessing the second VLAN.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
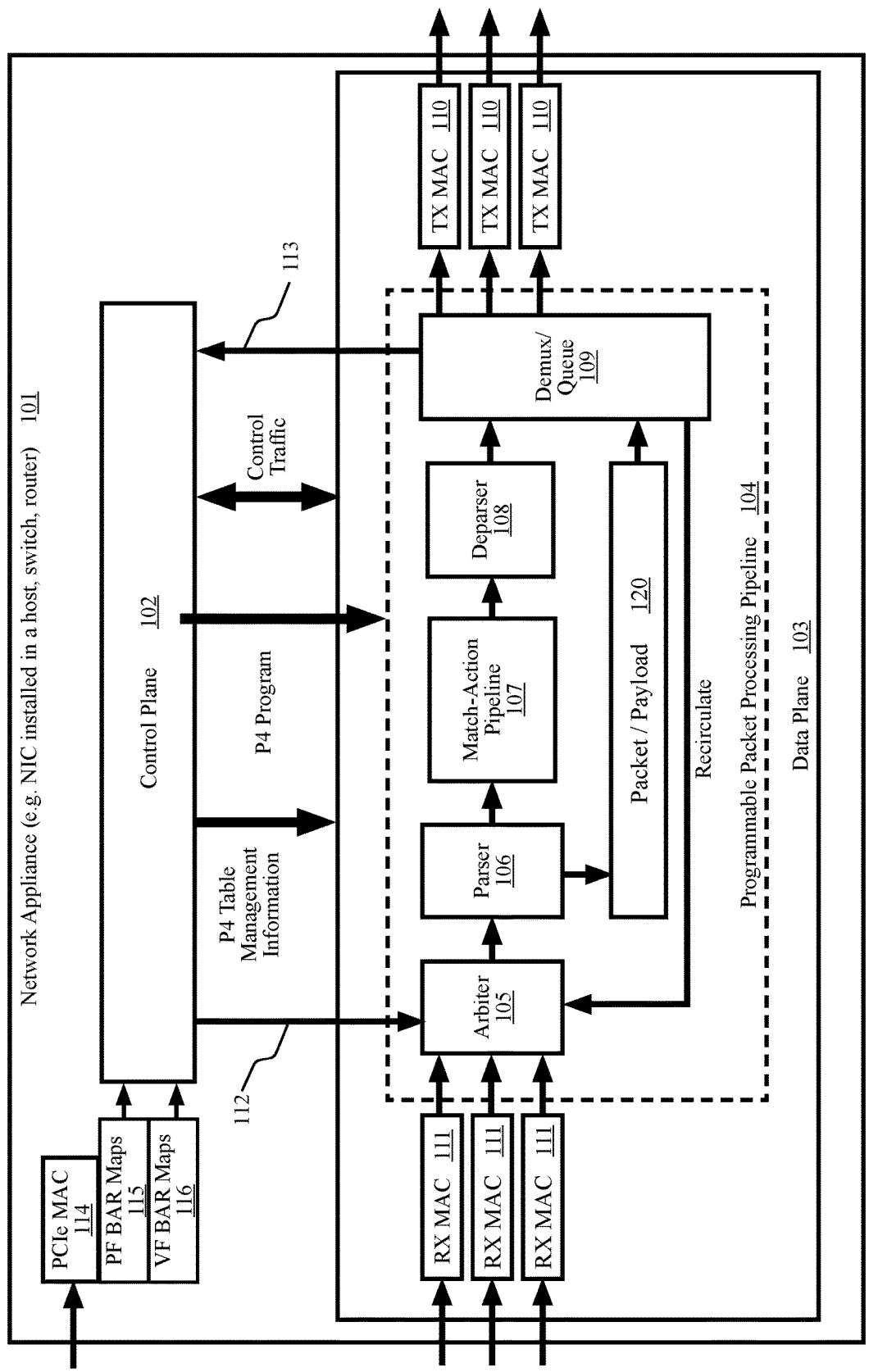
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

A networking appliance can contain a control plane and a data plane. Data planes (also called the forwarding planes), often implemented with special purpose circuits, are designed to rewrite and forward packets at extreme rates. Control planes are often similar to general purpose computers having general purpose CPU cores and large amounts of storage. The control plane can receive routing information and store routing rules. Routing rules can provide routes from the network appliance to other machines. The network appliance can use the routing rules to produce forwarding data. The control plane configures the data plane with the forwarding data. The data plane receives packets, rewrites them in accordance with the forwarding data, and then transmits them out of an interface specified using the forwarding data.

Data centers can have tens of thousands of servers with each server running tens of virtual machines (VMs) that use the tens or hundreds of thousands of virtual local area networks (VLANs) instantiated in the data center. The VMs can communicate with one another and the outside world using EVPNs that have virtual tunnel endpoints (VTEPs). There can be tens of thousands of VTEPs. Network appliances can route packets to the VMs via the VTEPs. An issue appearing in data centers is that the number of routes is exploding. Routers between segments of VLANs are particularly burdened when they store routes to machines and VTEPs in numerous VLAN segments. The control planes may have ample storage for storing the routing rules. The data planes, however, are being overwhelmed because the data planes may not have the resources to implement a forwarding rule for every machine or every VTEP on every VLAN.

Location identifier based forwarding decreases the amount of forwarding data required in the data plane. A location identifier can specify the location of a VLAN segment. For clarity, a local location and a remote location are considered and the VLAN has a local VLAN segment and a remote VLAN segment. A local machine on the local VLAN segment can send a layer 2 packet to a remote machine on the remote VLAN segment. The layer 2 packet can be initially encapsulated in a "local segment packet" that specifies the location identifier for the remote location and the virtual network identifier (VNID) of local VLAN segment. A local router can have a single forwarding rule implemented in its forwarding plane for forwarding packets based on that location identifier and that VNID. In accordance with the forwarding rule, the local router's data plane can re-encapsulate the packet and forward it to the remote VLAN segment. The router receiving the packet can then forward it to its destination at the remote location. As such, location based forwarding in the local segment can collapse a plethora of forwarding rules into a single forwarding rule.

One advantage of location identifier based forwarding is that the local router requires less forwarding data for forwarding packets to the remote location. Another advantage is that the local router's forwarding data can remain valid and unchanged as VTEPs and VMs are created and destroyed at the remote location. Yet another advantage is that the remote router does not have to be aware that the local router is configured to use location identifier based routing. As such, one location can be upgraded to use location identifier based routing without requiring the remote routers or locations to also be upgraded.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1 is a functional block diagram of a network appliance having a control plane and a data plane and in which aspects may be implemented. A network appliance 101 can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, as a P4 programmable router, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including, for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A network appliance 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC' VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 2:
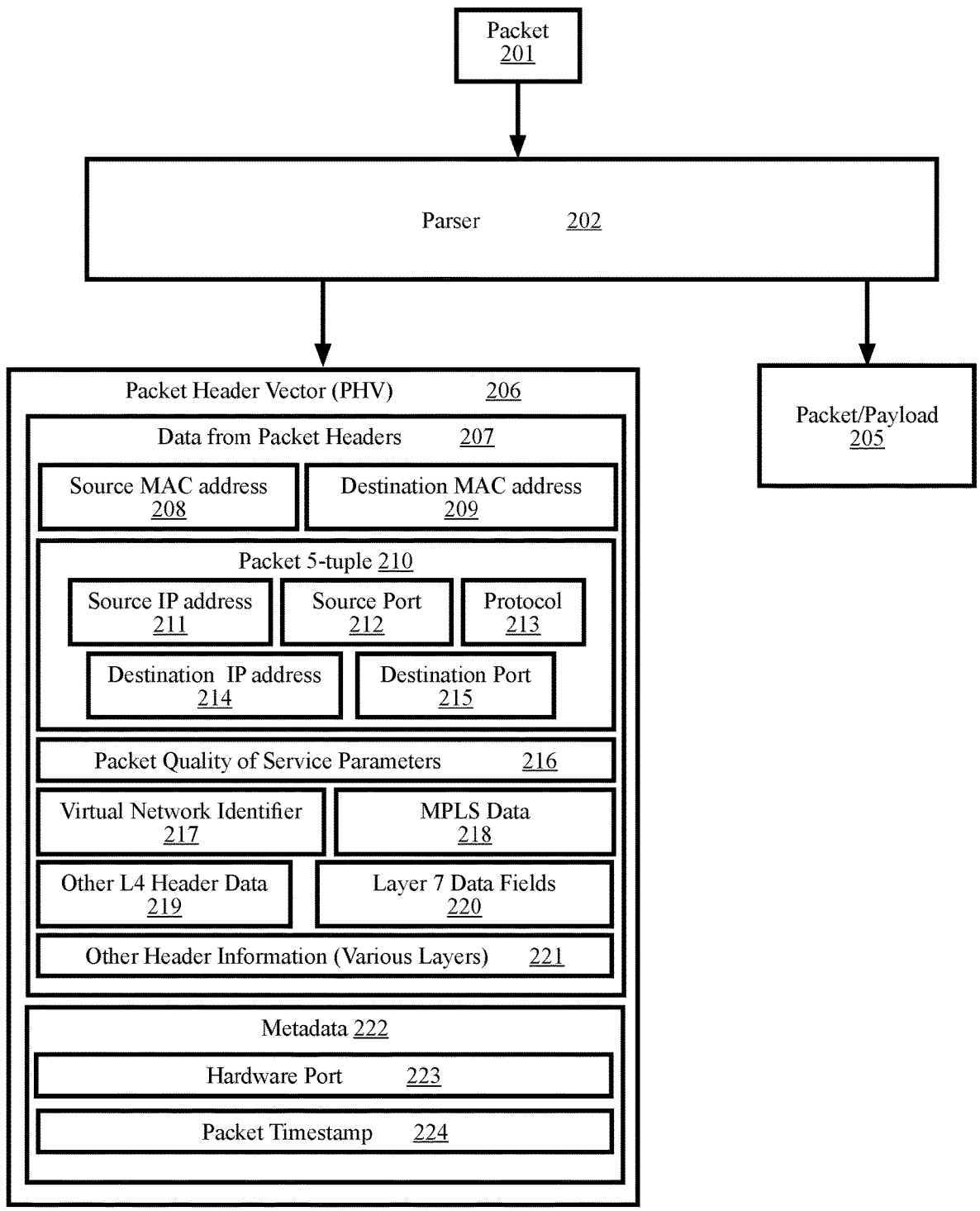
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The L7 data fields 220 can be obtained from the packet's layer 7 header or layer 7 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Figure 3:
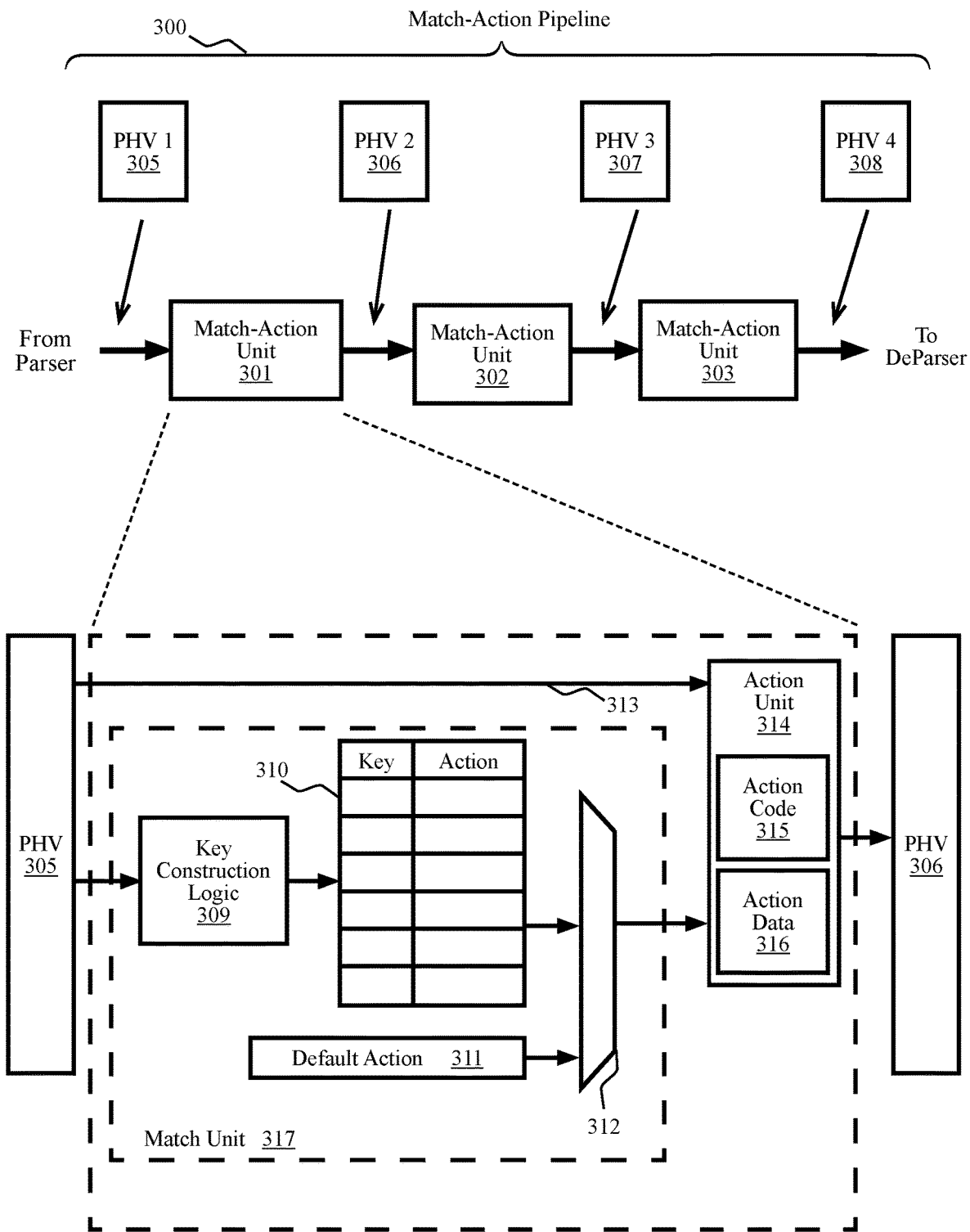
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table are managed by the control plane.

The lookup table 310 is a principal resource that is used for implementing forwarding rules in the data plane. The lookup table 310 is also limited in size and can be the specific data plane resource that is overwhelmed when tasked to store entries for a great number of VTEP and machine addresses. Location based forwarding may be implemented with keys based, at least in part, on location identifiers and VNIDs. As such, the lookup table may not be required to store entries for many VTEPs and machines on distant VLAN segments.

Figure 4:
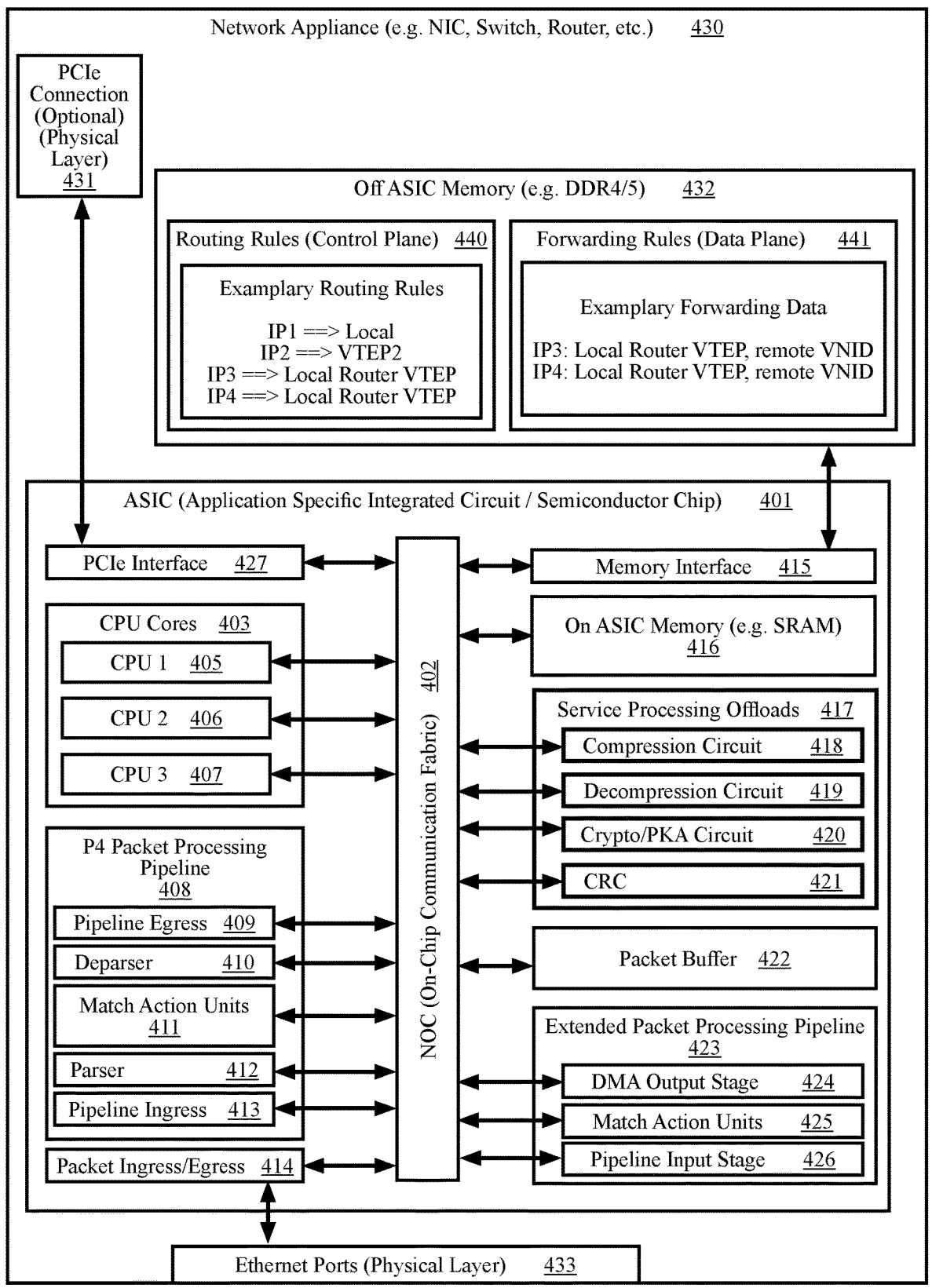
FIG. 4 is a functional block diagram of a network appliance having an ASIC (application specific integrated circuit), according to some aspects.

FIG. 4 is a functional block diagram of a network appliance 430 having an application specific integrated circuit (ASIC) 401, according to some aspects. If the network appliance is a network interface card (NIC) then the NIC can be installed in a host computer and can act as a network appliance for the host computer and for virtual machines running on the host computer. Such a NIC can have a PCIe connection 431 for communicating with the host computer. The network appliance 430 can have an ASIC 401, off-ASIC memory 432, and ethernet ports 433. The off-ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services. A network appliance that implements location identifier based forwarding can store routing rules 440 and forwarding data 441. The routing rules 440 can be produced by the control plane based on network reachability information. Network appliances often send network reachability information to one another within network packets such as border gateway protocol (BGP) packets. Those practiced in computer networking are familiar with BGP and the creation of prior art routing rules using network reachability information received in BGP packets. Control planes can produce forwarding data 441 from the routing rules. The control plane may then configure the data plane with all or some of the forwarding rules in the forwarding data. The data plane can process packets using the forwarding data with which the data plane is configured. When the data plane attempts to process a packet of a traffic flow for which the data plane is not configured, it can alert the control plane. The control plane may then configure the data plane for that traffic flow. In many cases, forwarding data for an expired or inactive traffic flow is deleted from the data plane in order to make room for new forwarding data.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline such as match-action pipeline 300. The extended packet processing pipeline has a pipeline input stage 426 that can receive PHVs or directives to perform operations. For example, data in the PHV can indicate that the PHV is a directive for implementing an RDMA operation. The key construction logic 309 of the MPUs can use the data to form a key that indexes into a lookup table 310 to locate an action. The MPUs can thereby execute actions such that the DMA output stage 424 writes InfiniBand PDU payload data into the off-ASIC memory 432 or into the host memory.

All memory transactions in the network appliance 430, including host memory transactions, on board memory transactions, and registers reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
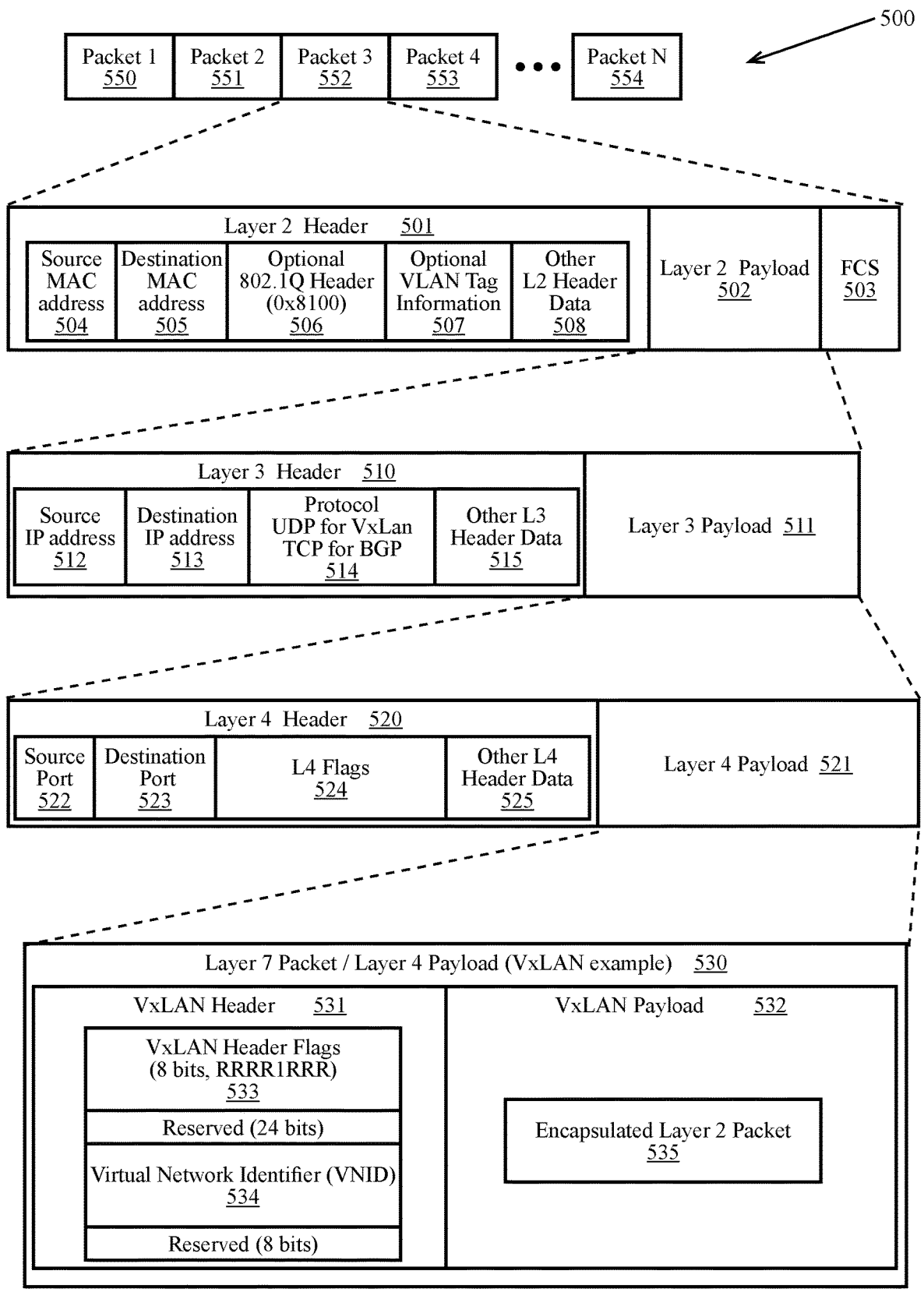
FIG. 5 illustrates packet headers and payloads of packets for network traffic flows including layer 7 fields according to some aspects.

FIG. 5 illustrates packet headers and payloads of packets for network traffic flows 500 including layer 7 fields according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" may refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, an optional 802.1Q header, optional VLAN tag information 507, and other layer 2 header data 508. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3, is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 506 and VLAN tag information 507 are specified by the IEEE 802.1Q standard. The 802.1Q header is the two-octet value 0x8100 that indicates that VLAN tag information 507 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 510 and a layer 3 payload 511. The layer 3 header 510 can have a source IP address 512, a destination IP address 513, a protocol indicator 514, and other layer 3 header data 515. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 511 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 510 using protocol indicator 514. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 511 includes a TCP header and a TCP payload. UDP can provide for computer applications to send messages, in this case referred to as datagrams, to other hosts on an IP network using a connectionless model. When carrying UDP data, a layer 3 payload 511 includes a UDP header and a UDP payload. ICMP is used by network devices, including routers, to send error messages and operational information indicating success or failure when communicating with another IP address. ICMP uses a connectionless model. VxLAN, discussed below, is carried via UDP. BGP is carried via TCP.

A layer 4 packet can have a layer 4 header 520 and a layer 4 payload 521. The layer 4 header 520 can include a source port 522, destination port 523, layer 4 flags 524, and other layer 4 header data 525. The source port and the destination port can be integer values used by host computers to deliver packets to application programs configured to listen to and send on those ports. The layer 4 flags 524 can indicate a status of or action for a network traffic flow. A layer 4 payload 521 can contain a layer 7 packet.

The application layer, often called layer 7, includes the protocols used by most applications for providing user services or exchanging application data over the network connections established by the lower-level protocols. Examples of application layer protocols include VxLAN, RDMA over Converged Ethernet version 2 (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol units (such as TCP or UDP messages), which in turn use lower layer protocols to effect actual data transfer.

A layer 4 payload 521 may include a layer 7 packet 530. A layer 7 packet can have a layer 7 header 531 and a layer 7 payload 532. The illustrated layer 7 packet is a VxLAN packet. VxLAN is specified in request for comment (RFC) 7238 published by the Internet Engineering Task Force (IETF) in August 2014. A VxLAN packet has a VxLAN header 531 and a VxLAN payload 532. The VxLAN header includes VxLAN header flags 533, a 24-bit virtual network identifier (VNID) 534, and reserved bits. The VxLAN payload 532 can include an encapsulated layer 2 packet 535 such as packets 550-554. Those practiced in computer networking are familiar with VxLAN.

Figure 6:
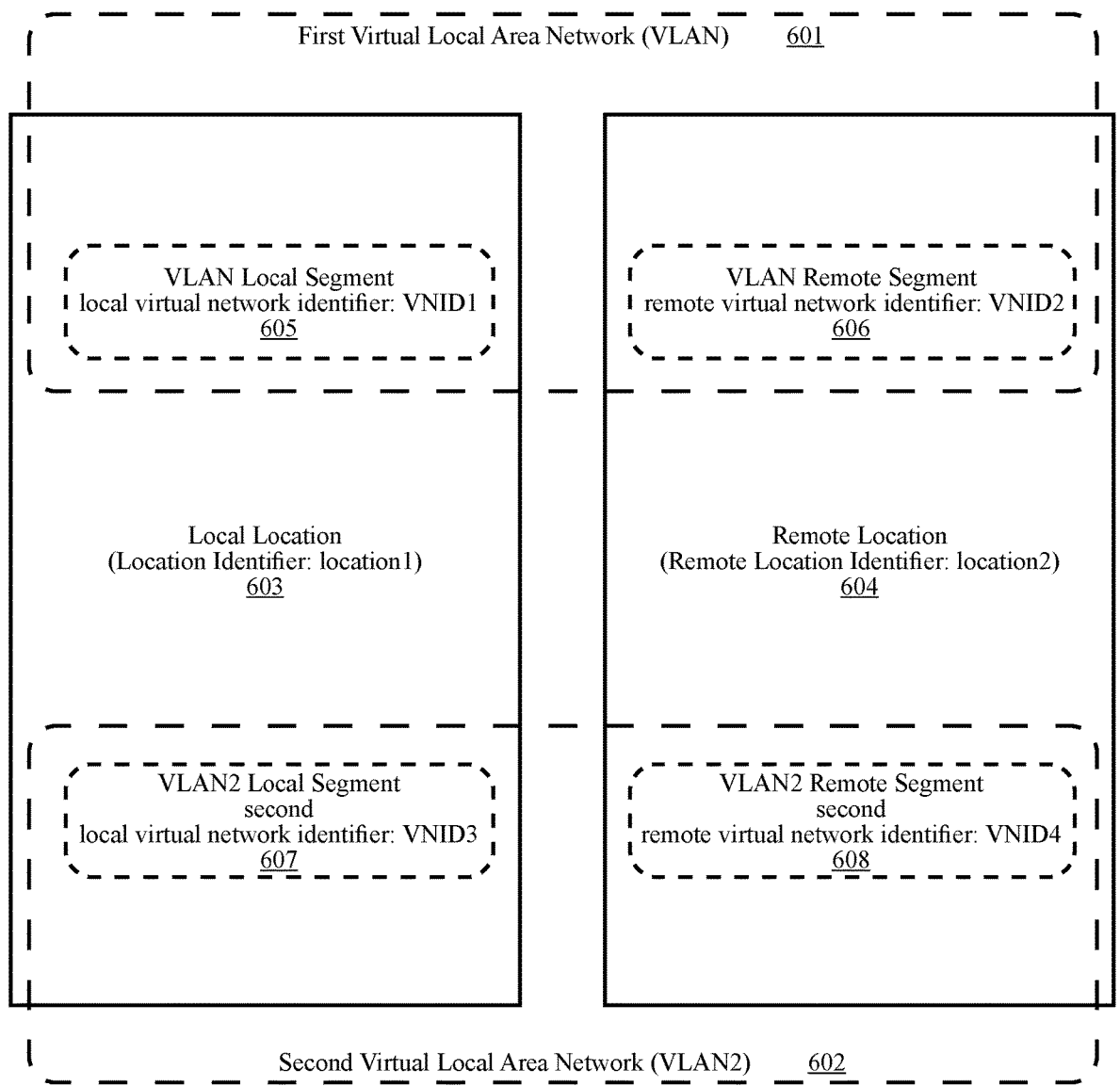
FIG. 6 illustrates multiple locations connected by multiple VLANs according to some aspects.

FIG. 6 illustrates multiple locations connected by multiple VLANs according to some aspects. A first VLAN 601 is deployed at a local location 603 and a remote location 604. The location identifier "location1" indicates the local location 603. The location identifier "location2" indicates the remote location. The first VLAN 601 has a VLAN local segment 605 at the local location 603 and has a VLAN remote segment 606 at the remote location 604. The VLAN local segment 605 uses the VNID VNID1. The VLAN remote segment 606 uses the VNID VNID2. The VLAN local segment 605 and the VLAN remote segment 606 are connected using VxLAN. A second VLAN (VLAN2) 602 is also deployed at the local location 603 and the remote location 604. VLAN2 602 has a VLAN2 local segment 607 at the local location 603 and has a VLAN2 remote segment 608 at the remote location 604. The VLAN2 local segment 607 uses the VNID VNID3. The VLAN2 remote segment 608 uses the VNID VNID4. The VLAN2 local segment 607 and the VLAN2 remote segment 608 are connected using VxLAN. The local location 603 may have a local LAN that carries both the VLAN1 local segment 605 and the VLAN2 local segment 607. The remote location 604 may have a remote LAN that carries both the VLAN1 remote segment 606 and the VLAN2 remote segment 608.

Figure 7:
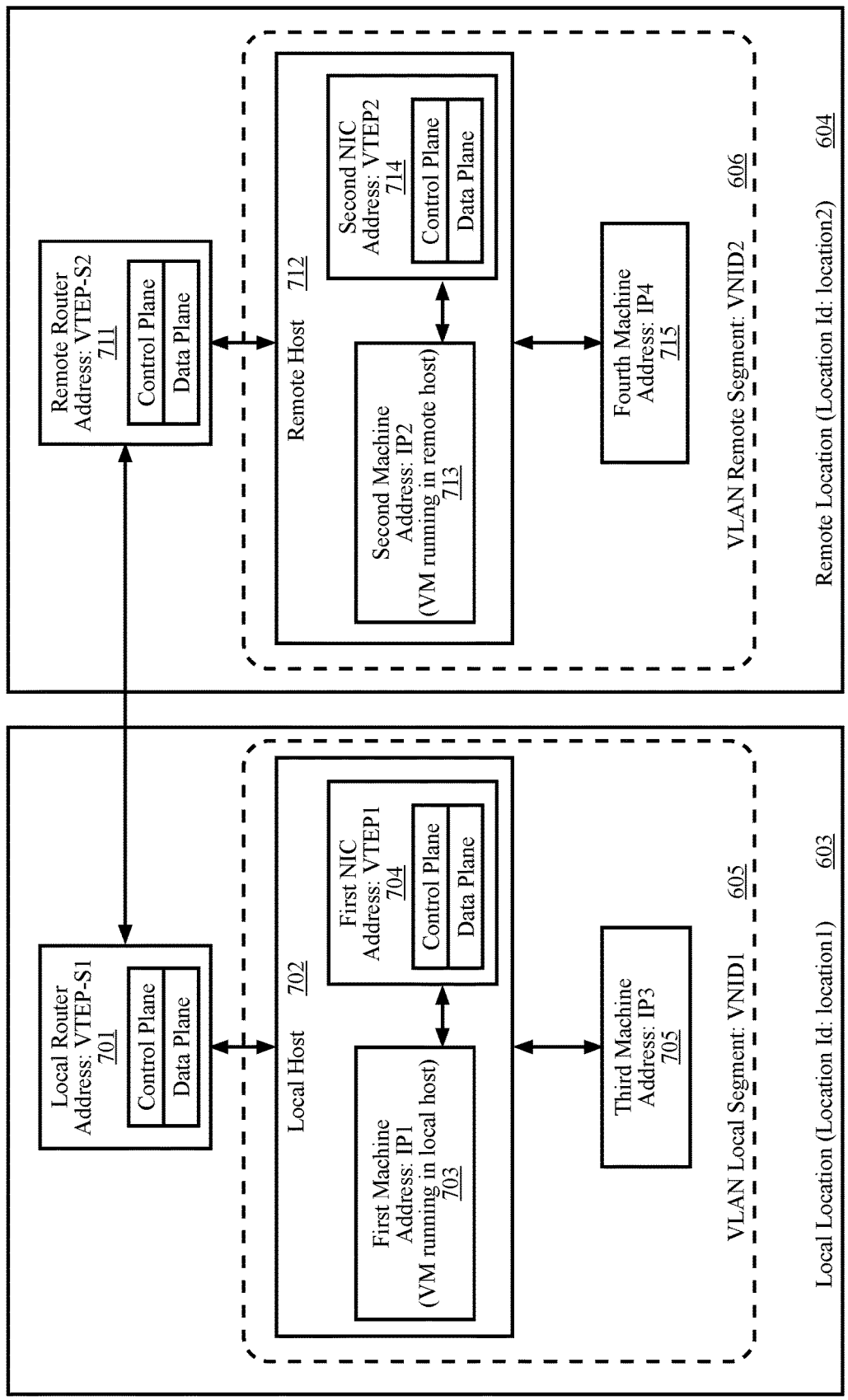
FIG. 7 illustrates a VLAN connecting machines at two locations according to some aspects.

FIG. 7 illustrates a VLAN connecting machines at two locations according to some aspects. A local router 701, a local host 702, and a third machine 705 are located at the local location 603. A first machine 703 is a VM that has the IP address IP1 and that is running on the local host 702. The third machine 705 has the IP address IP3. IP1 and IP3 are addresses on the VLAN local segment 605. A network interface card, the first NIC 704, is installed in the local host 702 and provides network connectivity for the local host 702 and the first machine 703. The first NIC 704 also provides a virtual tunnel endpoint at IP address VTEP1, which is a local VTEP because it is at the local location. The first machine 703 and the third machine 705 can use VTEP1 to communicate with machines on the VLAN remote segment 606.

A remote router 711, a remote host 712, and a fourth machine 715 are located at the remote location 604. A second machine 713 is a VM that has the IP address IP2 and that is running on the remote host 712. The fourth machine 715 has the IP address IP4. IP2 and IP4 are addresses on the VLAN remote segment 606. A network interface card, the second NIC 714, is installed in the remote host 712 and provides network connectivity for the remote host 712 and the second machine 713. The second NIC 714 also provides a virtual tunnel endpoint at IP address VTEP2, which is a remote VTEP because it is at the remote location. The second machine 713 and the fourth machine 715 can use VTEP2 to communicate with machines on the VLAN local segment 605.

A local router 701 and a remote router 711 can connect the VLAN local segment 605 and the VLAN remote segment 606 to one another via VxLAN. The local router 701 has the IP address VTEP-S1. The remote router 711 has the IP address VTEP-S2.

Figure 8:
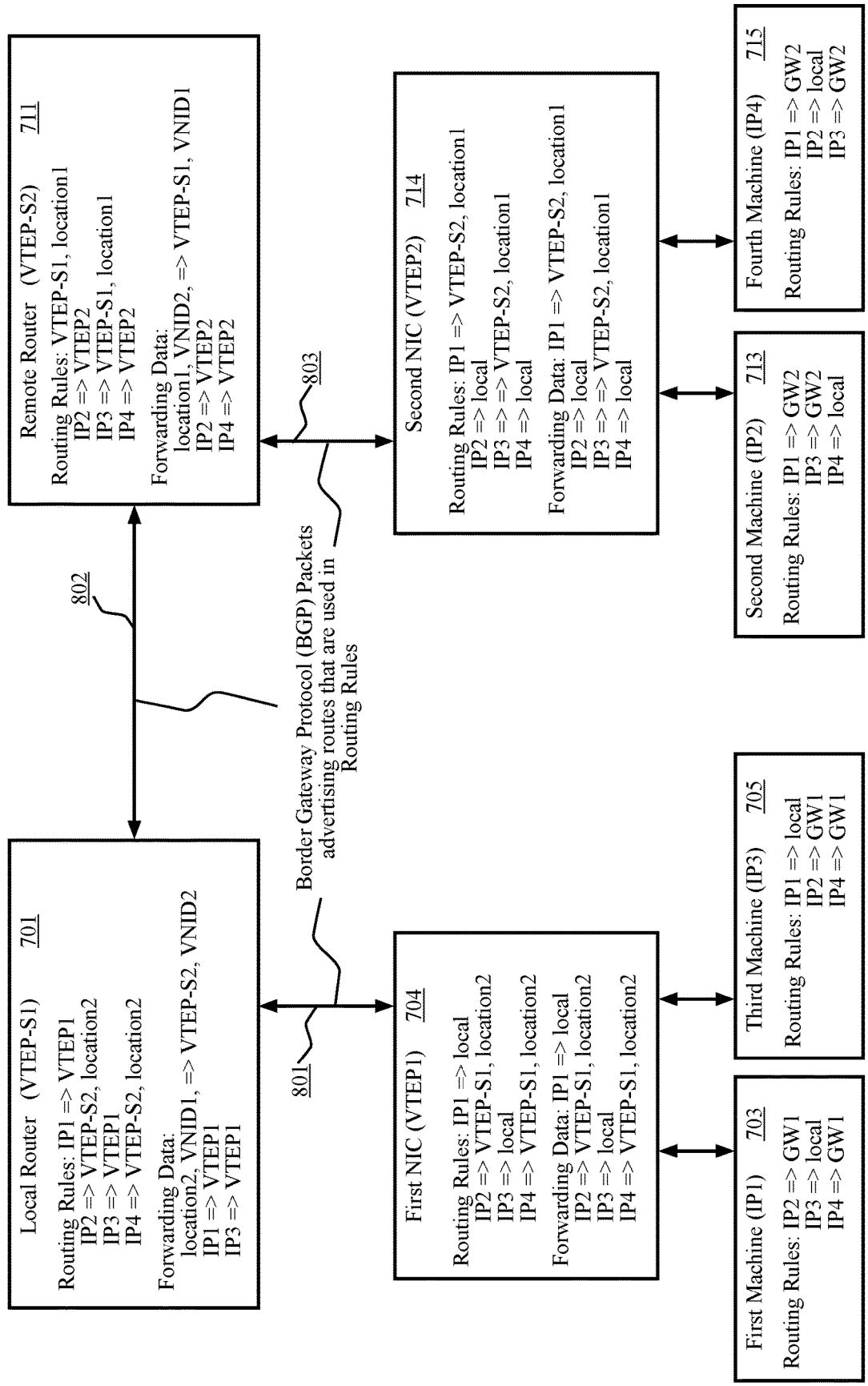
FIG. 8 illustrates routing rules and forwarding data for network appliances implementing a VLAN connecting machines at two locations according to some aspects.

FIG. 8 illustrates routing rules and forwarding data for network appliances implementing a VLAN connecting machines at two locations according to some aspects. BGP packets can carry network reachability information for advertising routes. The network appliances can use the advertised routes to produce routing rules. The routers 701, 711 and the NICs 704, 714 are the network appliances. The routing rules and forwarding data shown in FIGS. 8-13 relate to the first VLAN 601.

The first NIC 704 has routing rules for reaching IP1 and IP3 locally on the local VLAN segment 605 whereas IP2 and IP4 are to be sent to the remote location 604, which has the location identifier "location2", via VTEP-S1. The first NIC 704 has forwarding data that configures its data plane to forward to IP1 and IP3 on the VLAN local segment 605. The first NIC 704 also has forwarding data that configures its data plane to encapsulate packets for IP2 and IP4 packets in local segment packets containing "location2", the site identifier for the remote location, and to forward the local segment packets to VTEP-S1. The first machine 703 and the third machine 705 are configured to send packets for IP2 and IP4 to VTEP1.

The local router 701 has routing rules for routing packets to IP1 and IP3 via VTEP1. The local router's forwarding data for IP1 and IP3 configures the local router's data plane to encapsulate packets for IP1 and IP3 in remote segment packets as detailed below in FIG. 10 and forward the remote segment packets to VTEP1.

The local router 701 has routing rules for routing packets to IP2 and IP4 to location2 via VTEP-S2. The local router's forwarding data is configured with a single forwarding rule for local segment packets on the VLAN local segment 605 (having VNID1) and the location identifier "location2". In accordance with the single forwarding rule, the data plane unpacks the layer 2 packet, encapsulates it in a packet (an outer packet which can be a VxLAN packet) for the remote location, and forwards it to VTEP-S2.

The second NIC 714 has routing rules for reaching IP2 and IP4 locally on the VLAN remote segment 606 whereas IP1 and IP3 are to be sent to the local location 603, which has the location identifier "location1", via VTEP-S2. The second NIC 714 has forwarding data that configures its data plane to forward IP2 and IP4 on the VLAN remote segment 606. The second NIC 714 also has forwarding data that configures its data plane to encapsulate packets for IP1 and IP3 packets in local segment packets containing "location1", the site identifier for the local location, and to forward the local segment packets to VTEP-S2. The second machine 713 and the fourth machine 715 are configured to send packets for IP1 and IP3 to VTEP2.

The remote router 711 has routing rules for routing packets to IP2 and IP4 via VTEP2. The remote router's forwarding data for IP2 and IP4 configures the remote router's data plane to encapsulate packets for IP2 and IP4 in remote segment packets and to forward the remote segment packets to VTEP2.

The remote router 711 has routing rules for routing packets to IP1 and IP3 to location1 via VTEP-S1. The remote router's forwarding data is configured with a single forwarding rule for local segment packets on the VLAN remote segment 606 (having VNID2) and the location identifier "location 1". In accordance with that single forwarding rule, the data plane unpacks the layer 2 packet, encapsulates it in a packet (an outer packet which can be a VxLAN packet) for the local location, and forwards it to VTEP-S1.

Figure 9:
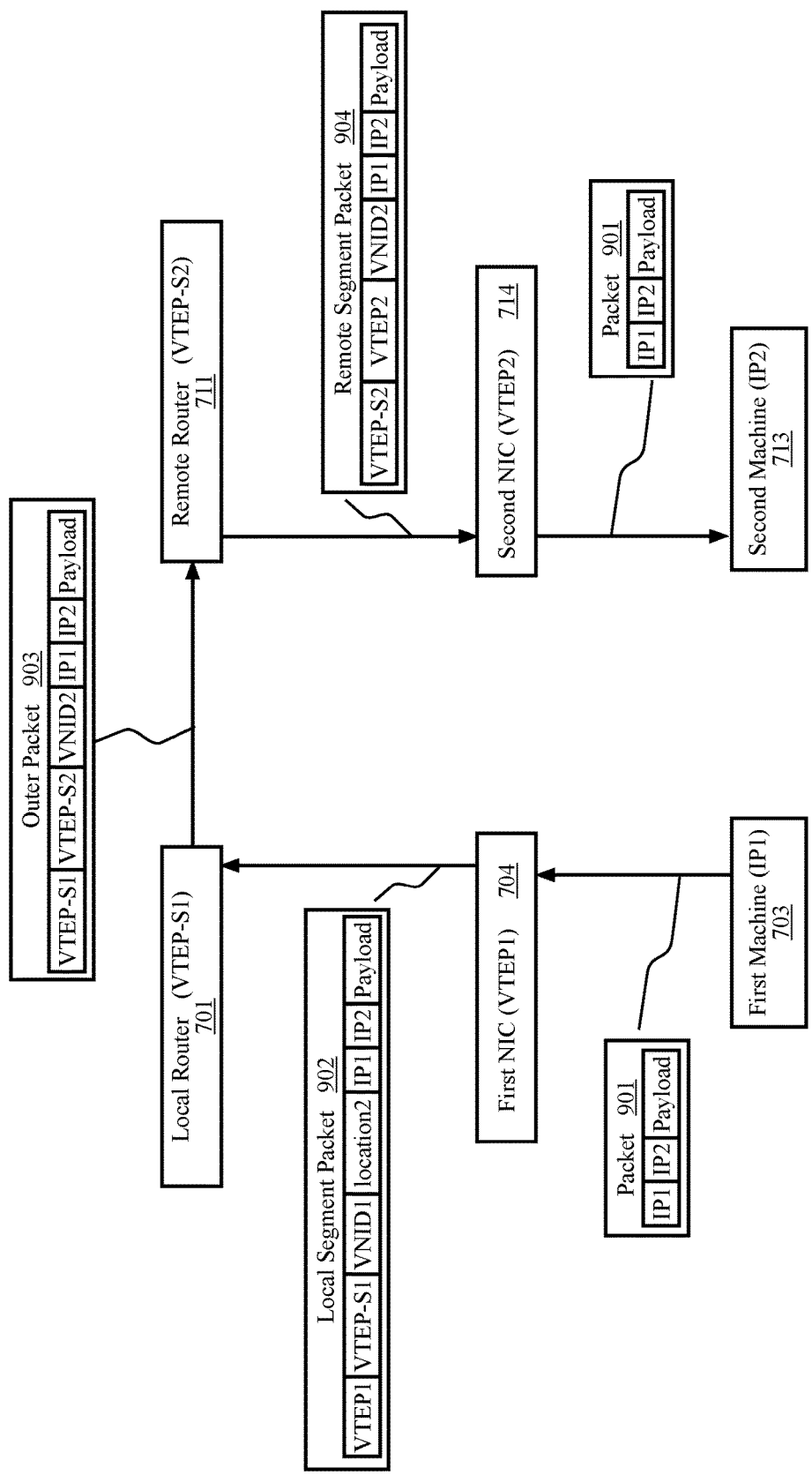
FIG. 9 illustrates a packet traveling from a first machine on one VLAN segment to a second machine on another VLAN segment according to some aspects.

FIG. 9 illustrates a packet 901 traveling from a first machine 703 on one VLAN segment to a second machine 713 on another VLAN segment according to some aspects. The first machine 703 has IP address IP1 on the VLAN and the second machine 713 has IP address IP2 on the VLAN. The packet 901 therefore has the source address IP1, the destination address IP2, and a payload. In accordance with its routing rules, the first machine 703, which is on the VLAN local segment 605, forwards the packet to GW1, which is the first NIC 704. The first NIC provides VTEP1 for the VLAN local segment 605. The first NIC 704 encapsulates the packet 901 in a local segment packet 902. The local segment packet 902 has the source address VTEP1, the destination address VTEP-S1 (the local router), the VNID VNID1 (the VNID of the local VLAN segment), and a field indicating the packet is going to location2. The first NIC 704 then forwards the packet to the local router 701.

As discussed above, the local router's forwarding data has a single forwarding rule for local segment packets with VNID and location2. Accordingly, the local router strips the packet 901 out of the local segment packet 902 and then encapsulates the packet 901 in an outer packet 903, which can be a VxLAN packet. The outer packet 903 has the source address VTEP-S1, the destination address VTEP-S2, and the VNID VNID2. Notice that the outer packet 903 does not indicate a location identifier. In fact, location identifiers are not used in this example after the packet 901 is forwarded from the local router 701. As such, the network appliances at the remote location may be unaware of location identifiers or of location identifier based forwarding of packets.

The remote router 711 strips the packet 901 from the outer packet 903 and encapsulates it in a remote segment packet 904. The remote segment packet 904 has source address VTEP-S2, destination address VTEP2, and VNID VNID2. The remote router forwards the remote segment packet 904 to the second NIC 714. The second NIC 714 strips the packet from 901 from the remote segment packet 904 and forwards it to the second machine 713.

Figure 10:
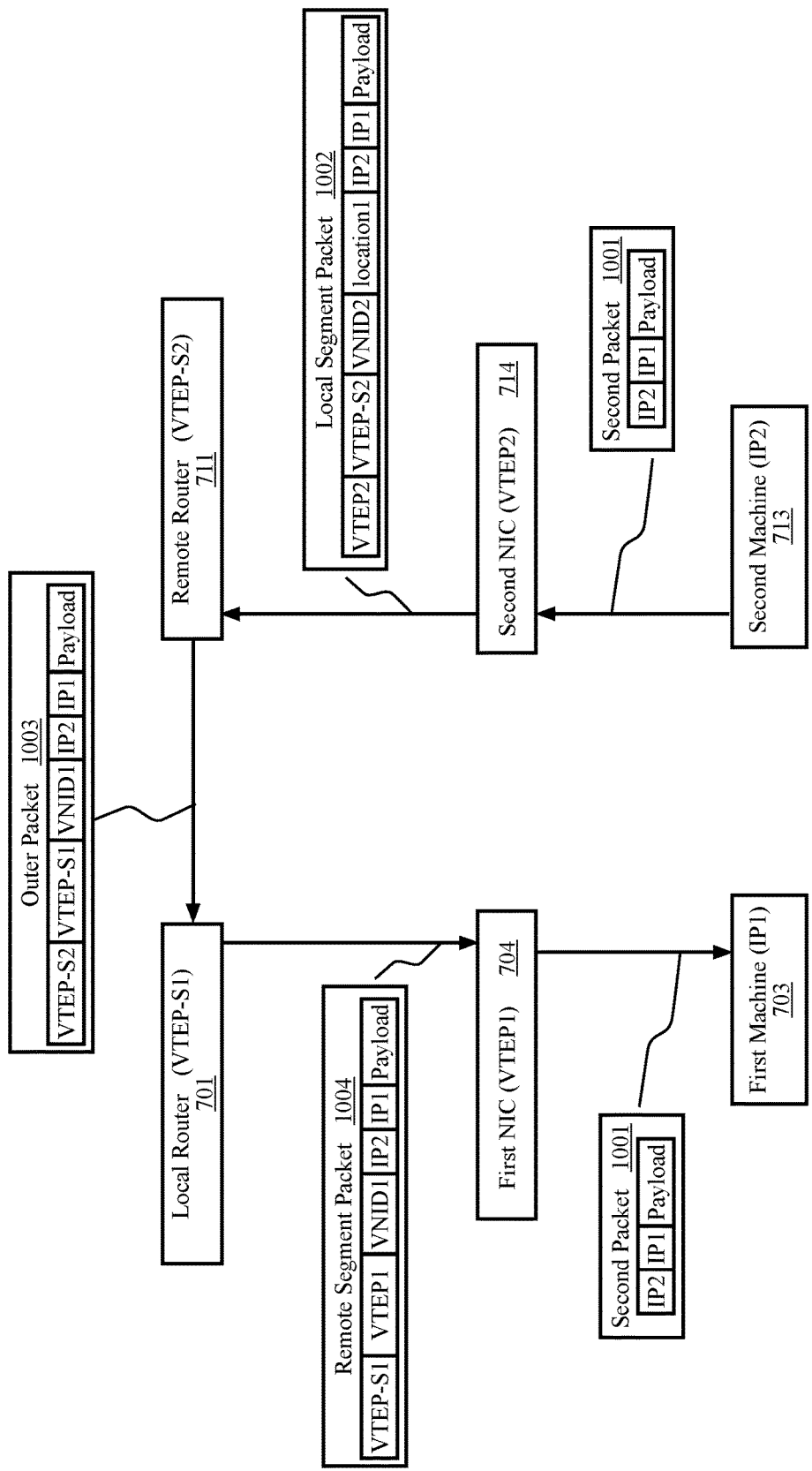
FIG. 10 illustrates a second packet traveling a return path from the second machine to the first machine according to some aspects.

FIG. 10 illustrates a second packet 1001 traveling a return path from the second machine 713 to the first machine 703 according to some aspects. The second packet 1001 therefore has the source address IP2, the destination address IP1, and a payload. In accordance with its routing rules, the second machine 713, which is on the VLAN remote segment 606, forwards the second packet to GW2, which is the second NIC 714. The second NIC provides VTEP2 for the VLAN remote segment 606. The second NIC 714 encapsulates the second packet 1001 in a local segment packet 1002. The local segment packet 1002 has the source address VTEP2, the destination address VTEP-S2 (the remote router), the VNID VNID2 (the VNID of the remote VLAN segment), and a field indicating the packet is going to location1. The second NIC 714 then forwards the packet to the remote router 711.

The remote router's forwarding data has a single forwarding rule for local segment packets with VNID2 and location1. Accordingly, the remote router strips the second packet 1001 out of the local segment packet 1002 and then encapsulates the second packet 1001 in an outer packet 1003, which can be a VxLAN packet. The outer packet 1003 has the source address VTEP-S2, the destination address VTEP-S1, and the VNID VNID1. The local router 701 strips the second packet 1001 from the outer packet 1003 and encapsulates it in a remote segment packet 1004. Remote segment packets can be VxLAN packets. The remote segment packet 1004 has source address VTEP-S1, destination address VTEP1, and VNID VNID1. The local router forwards the remote segment packet 1004 to the first NIC 704. The first NIC 704 strips the second packet from 1001 from the remote segment packet 1004 and forwards it to the first machine 703.

Figure 11:
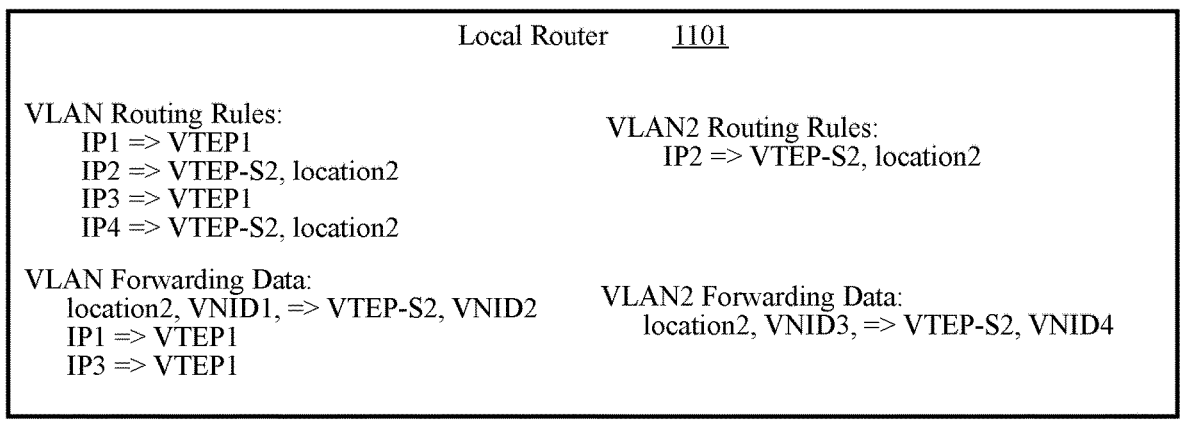
FIG. 11 illustrates a local router's routing rules and forwarding data according to some aspects.

FIG. 11 illustrates a local router's routing rules and forwarding data according to some aspects. The routing rules and forwarding data for the first VLAN are substantially similar to those previously discussed. The local router 1101 also implements location identifier based forwarding for a second VLAN. A single forwarding rule in the forwarding data of the local router 1101 is used to process local segment packets on VLAN2 that are being sent to the second location. Such packets have VNID VNID3 and a location field indicating location2. As such, the forwarding plane is configured to strip the encapsulated packet from a local segment packet and then encapsulate it in an outer packet that has the source address VTEP-S1, the destination address VTEP-S2, and the VNID VNID4.

Figure 12:
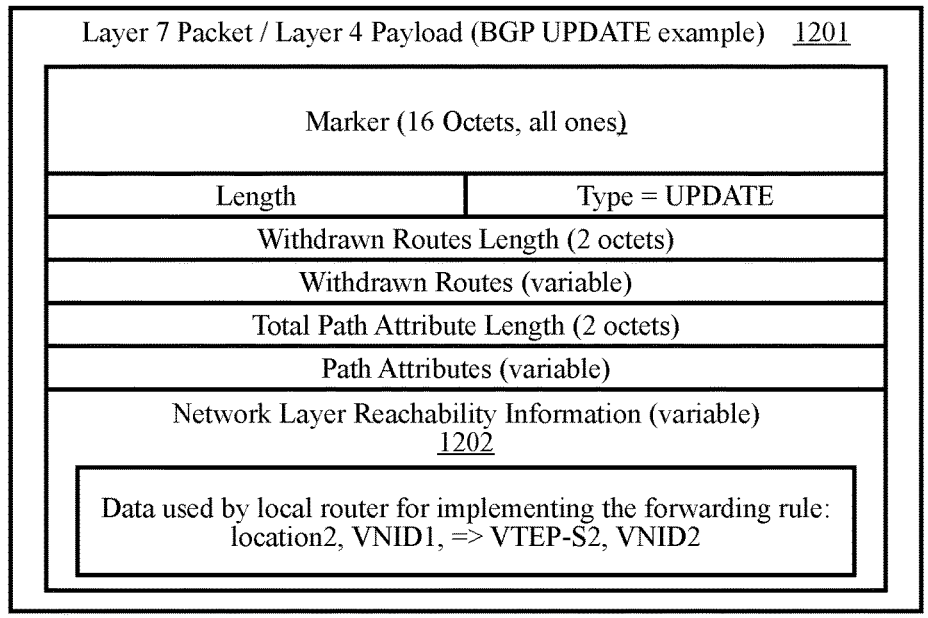
FIG. 12 illustrates border gateway protocol (BGP) packet contents according to some aspects.

FIG. 12 illustrates border gateway protocol (BGP) packet 1201 contents according to some aspects. There have been a number of versions of BGP. BGP-4 is specified in IETF RFC 4271 titled "A Border Gateway Protocol 4 (BGP-4)" published by the IETF in January 2006. In accordance with RFC 4271, a BGP packet can be an UPDATE packet carrying information that network appliances can use for deleting, creating, and amending their routing rules. Network layer reachability information 1202 is data that one network appliance can provide to another network appliance to "advertise" routes. For example, the Network layer reachability information 1202 can indicate a plethora of routes to machines and VTEPs at a remote location. The remote location (e.g., location2) may be inferred by the local router in that all the routes pass through the remote router. The local router may then associate a location identifier with those remote machines and VTEPs. The local router may also create a forwarding rule in its own forwarding data that configures its own data plane to: strip encapsulated packets from local segment packets having VNID VNID1 and location identifier location2; and then encapsulate the packets in outer packets that have the source address VTEP-S1, the destination address VTEP-S2, and the VNID VNID2. The local router can also send network reachability information to other network appliances such that those network appliances encapsulate certain packets in local segment packets having VNID VNID1 and location identifier location2.

Figure 13:
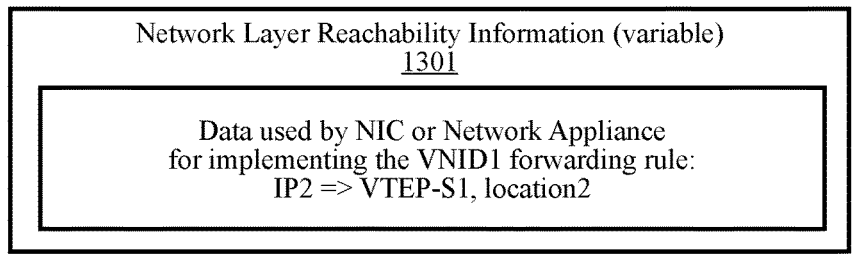
FIG. 13 illustrates network layer reachability information according to some aspects.

FIG. 13 illustrates network layer reachability information 1301 according to some aspects. Specifically, the network reachability information may be received by a NIC, perhaps from a local router. The NIC can use the network layer reachability information 1301 to create forwarding data such that: a packet having the destination address IP2 is encapsulated in a local segment packet having VNID VNID1 and location identifier location2; and the local segment packet is forwarded to VTEP-S1.

Figure 14:
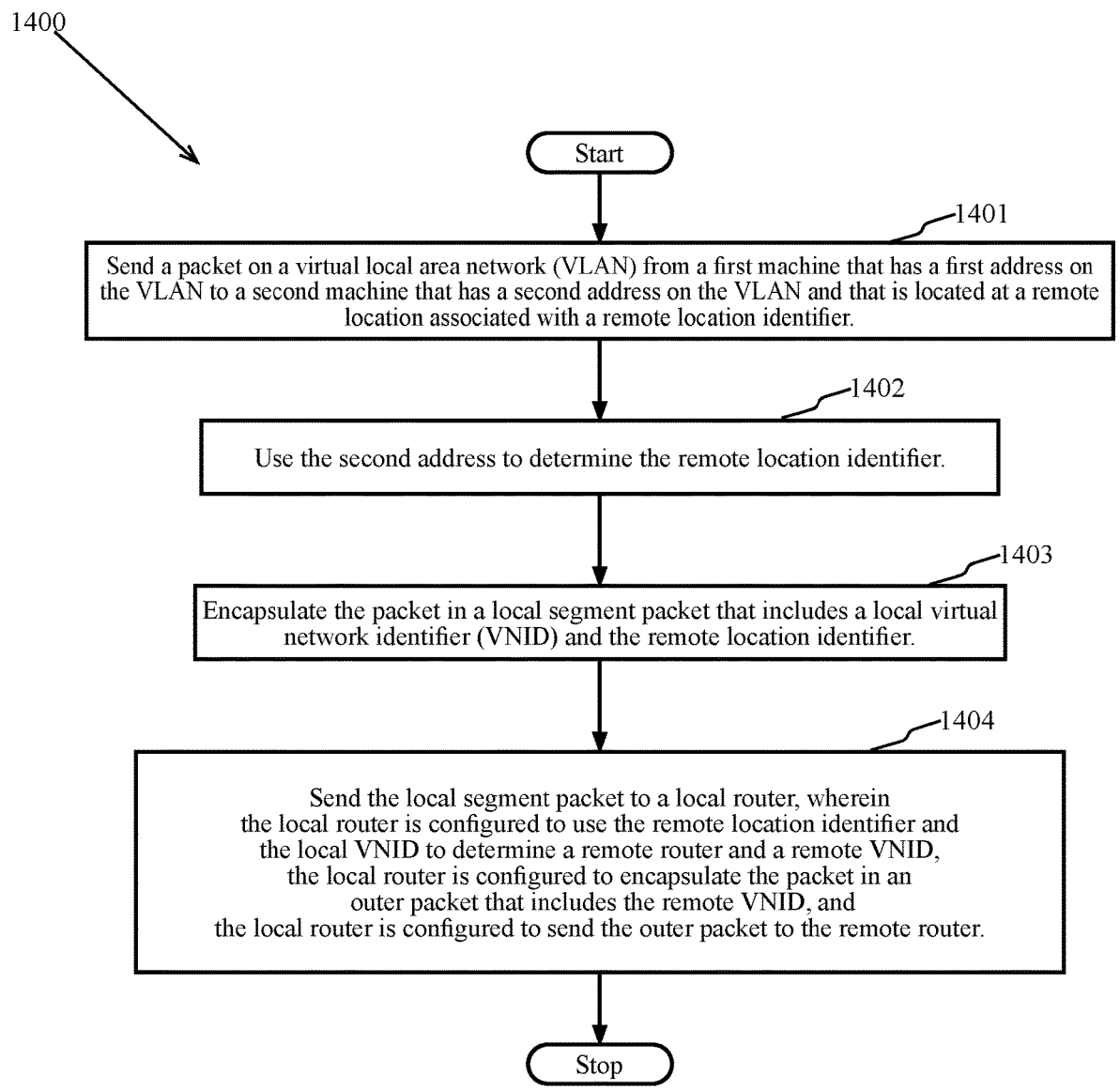
FIG. 14 is a high-level flow diagram illustrating a method for using location identifier based forwarding according to some aspects.

FIG. 14 is a high-level flow diagram illustrating a method for using location identifier based forwarding according to some aspects. After the start, at block 1401 the method can send a packet on a virtual local area network (VLAN) from a first machine that has a first address on the VLAN to a second machine that has a second address on the VLAN and that is located at a remote location associated with a remote location identifier. At block 1402, the method can use the second address to determine the remote location identifier. At block 1403, the method can encapsulate the packet in a local segment packet that includes a local virtual network identifier (VNID) and the remote location identifier. At block 1404, the method can send the local segment packet to a local router. The local router can be configured to use the remote location identifier and the local VNID to determine a remote router and a remote VNID, the local router is configured to encapsulate the packet in an outer packet that includes the remote VNID, and the local router is configured to send the outer packet to the remote router.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
    receiving, by a local virtual tunnel endpoint (VTEP), a packet on a virtual local area network (VLAN) from a first machine that has a first address on the VLAN to a second machine that has a second address on the VLAN and that is located at a remote location associated with a remote location identifier;
    using, by the local VTEP, the second address to determine the remote location identifier;
    encapsulating, by the local VTEP, the packet in a local segment packet that includes a local virtual network identifier (VNID) and the remote location identifier; and
    sending the local segment packet to a local router, wherein
        the local router is configured to use the remote location identifier and the local VNID to determine a remote router address and a remote VNID,
        the local router is configured to encapsulate the packet in an outer packet that includes the remote VNID,
        the local router is configured to send the outer packet to a remote router at the remote router address, and
        the outer packet does not use the remote location identifier to indicate that the packet is going to the remote location.

2. The method of claim 1 wherein:
    the second machine accesses the VLAN using a remote virtual tunnel endpoint (VTEP) provided by a remote host;
    the remote VTEP has a remote VTEP address;
    a local host encapsulates the packet in the local segment packet;
    the local host processes the packet without using the remote VTEP address; and
    the local router is configured to process the packet using a forwarding rule that does not include the remote VTEP address.

3. The method of claim 1 wherein:
    the remote router is configured to use the second address to determine a remote VTEP address;
    the remote router is configured to encapsulate the packet in a remote segment packet that includes the remote VNID;
    the remote router is configured to send the remote segment packet to a remote host; and
    the second machine receives the packet via the remote host.

4. The method of claim 1 wherein:
    the first machine is configured to send the packet to the second machine via a local VTEP that is provided by a local network appliance;
    the VLAN includes a plurality of remote machines located at the remote location; and
    the local network appliance implements a single forwarding rule for forwarding packets to the remote machines.

5. The method of claim 1 further including:
    receiving the local segment packet;
    using the remote location identifier and the local VNID to determine the remote router and the remote VNID;
    encapsulating the packet in the outer packet; and
    sending the outer packet to the remote router.

6. The method of claim 1 further including:
    implementing, by the local router, a forwarding rule based on a border gateway protocol packet that includes the remote location identifier, an address of the remote router, the local VNID, and the remote VNID; and
    encapsulating the packet in the outer packet based on the forwarding rule.

7. The method of claim 1 further including:
    implementing a forwarding rule based on a border gateway protocol packet that includes the remote location identifier, an address of the local router, and the local VNID; and
    encapsulating the packet in the local segment packet based on the forwarding rule.

8. The method of claim 1 wherein:
    the first machine is a virtual machine running on a local host configured with a network interface card (NIC) that sends the local segment packet to the local router, and
    the NIC includes a packet processing pipeline configured to encapsulate the packet in the local segment packet.

9. The method of claim 1 wherein:
    the local router includes a packet processing pipeline configured to encapsulate the packet in the outer packet.

10. The method of claim 1 further including:
    receiving, by the local router, a second outer packet that includes the local VNID and a second packet that has the first address as a destination address;
    using the first address to determine a local VTEP provided by a local host;
    sending the second packet to the local host encapsulated in a remote segment packet; and
    delivering the second packet to the first machine via the local VTEP.

11. A system comprising:
    a network appliance, wherein
    the network appliance is configured to receive a packet from a first machine that has a first address a virtual local area network (VLAN) and has a second address on the VLAN indicating a second machine that is located at a remote location associated with a remote location identifier;

the network appliance is configured to use the second address to determine the remote location identifier;

the network appliance is configured to encapsulate the packet in a local segment packet that includes a local virtual network identifier (VNID) and that includes the remote location identifier to indicate that the packet is going to the remote location;

the network appliance is configured to send the local segment packet to a local router;

the local router is configured to use the remote location identifier and the local VNID to determine a remote router address and a remote VNID;

the local router is configured to encapsulate the packet in an outer packet that includes the remote VNID;

the local router is configured to send the packet to a remote router at the remote router address; and the outer packet does not use the remote location identifier to indicate that the packet is going to the remote location.

12. The system of claim 11 wherein:
the second machine accesses the VLAN using a remote virtual tunnel endpoint (VTEP) provided by a remote host; and
the network appliance processes the packet without using a forwarding rule that includes a remote VTEP address.

13. The system of claim 11 wherein:
a second local VNID and a second remote VNID are used by a second VLAN; and
the local router is configured to use the remote location identifier and the second local VNID to determine the remote router address and the second remote VNID.

14. The system of claim 11 wherein:
the first machine is configured to send the packet to the second machine via a local virtual tunnel endpoint (VTEP) that is provided by a local network appliance;
the VLAN includes a plurality of remote machines located at the remote location; and
the local network appliance implements a single forwarding rule for forwarding packets to the remote machines.

15. The system of claim 14 wherein:
the local router receives a border gateway protocol packet that includes the remote location identifier, the remote router address, the local VNID, and the remote VNID;
the local router implements a forwarding rule based on the border gateway protocol packet; and
the local router encapsulates the packet in the outer packet based on the forwarding rule.

16. The system of claim 14 wherein the local router is configured to:
receive a second outer packet that includes the local VNID and a second packet that has the first address as a destination address;
use the first address to determine a local VTEP provided by a local host;
encapsulate the second packet in a second local segment packet; and
send the second local segment packet to the local host.

17. The system of claim 11, wherein:
the network appliance receives a border gateway protocol packet that includes the remote location identifier, an address of the local router, and the local VNID;
the network appliance implements a forwarding rule based on the border gateway protocol packet; and
the network appliance encapsulates the packet in the local segment packet based on the forwarding rule.

18. The system of claim 11 wherein:
the network appliance is a network interface card (NIC) installed in a local host;
the first machine is a virtual machine running on the local host; and
the NIC includes a packet processing pipeline configured to encapsulate the packet in the local segment packet.

19. A system comprising:
a means mapping from a plurality of remote IP addresses on a remote VLAN segment to a local router address in combination with a means for indicating a remote location;
a means for mapping from a local VNID in combination with the means for indicating the remote location to a remote router address in combination with a remote VNID;
a first VTEP means for receiving a packet that has a destination address that is one of the remote IP addresses;
a first encapsulation means for communicating the packet, the local VNID, and the means for indicating the remote location; and
a second encapsulation means for communicating the packet to a remote route at the remote router address,
wherein the second encapsulation means does not use the means for indicating the remote location to indicate that the packet is going to the remote location.

20. The system of claim 19 further including:
a means for sending a second packet on a second VLAN to a second remote machine at the remote location; and
a means for routing the second packet to the remote location using the means for indicating the remote location,
wherein the means for routing the second packet does not identify a VTEP used by the second remote machine for accessing the second VLAN.

* * * * *